(No Model.) 5 Sheets—Sheet 1.

L. S. CHICHESTER.
WATER RENOVATOR.

No. 398,494. Patented Feb. 26, 1889.

WITNESSES: Philip G. Voigtlen. E. L. Sherman.

INVENTOR: Lewis S. Chichester, BY Drake ATT'YS.

(No Model.) 5 Sheets—Sheet 3.

L. S. CHICHESTER.
WATER RENOVATOR.

No. 398,494. Patented Feb. 26, 1889.

WITNESSES: INVENTOR
Philip G. Voeghten
E. L. Sherman
Lewis S. Chichester,
BY Drake & Co. ATT'YS.

(No Model.) 5 Sheets—Sheet 4.

L. S. CHICHESTER.
WATER RENOVATOR.

No. 398,494. Patented Feb. 26, 1889.

WITNESSES: Philip G. Voeghtlen. E. L. Sherman.

INVENTOR Lewis S. Chichester BY Drake ATT'YS.

(No Model.)  5 Sheets—Sheet 5.
L. S. CHICHESTER.
WATER RENOVATOR.
No. 398,494.  Patented Feb. 26, 1889.
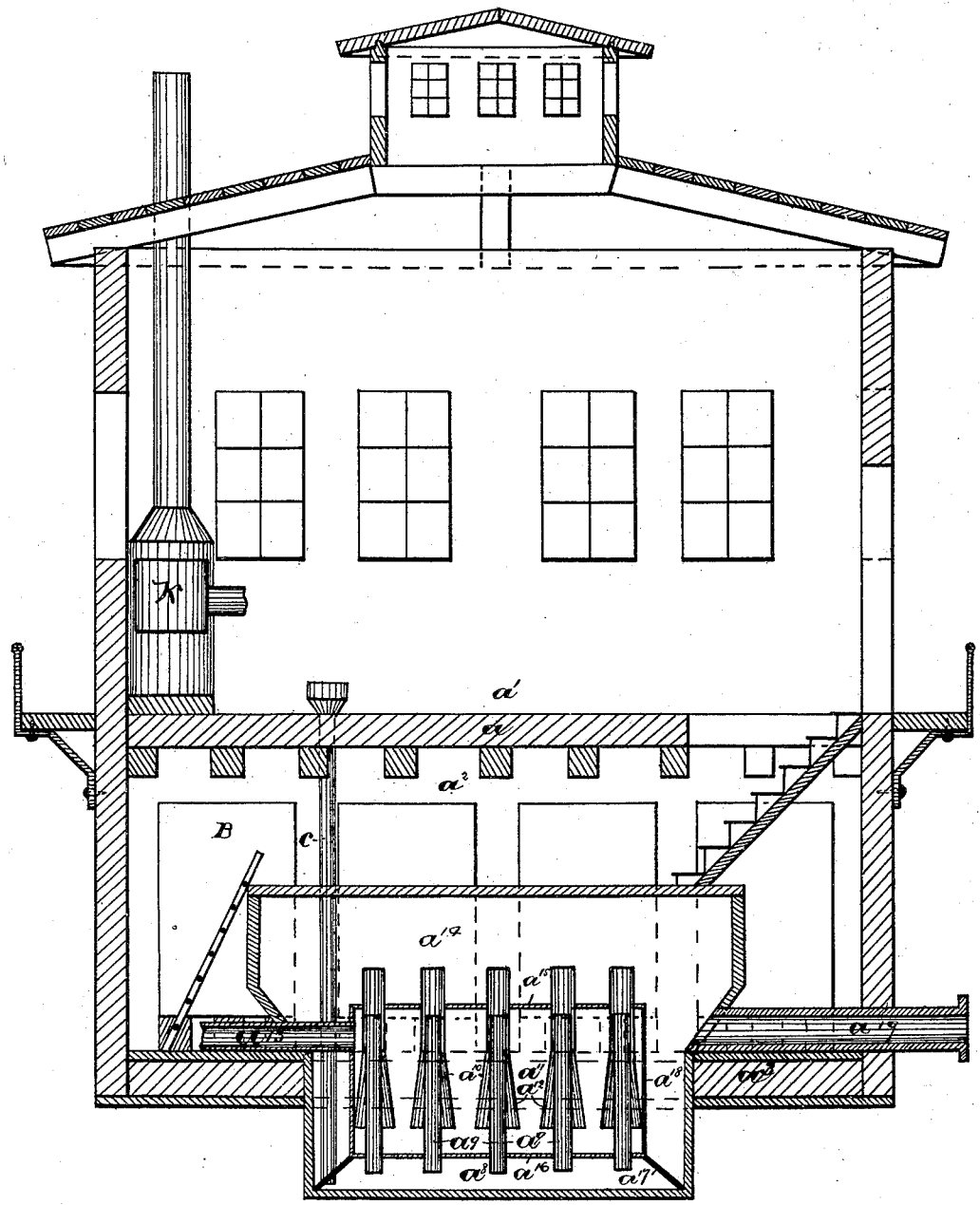
Fig. II.
WITNESSES:  INVENTOR:
Philip G. Voightlen  Lewis S. Chichester,
E. L. Sherman  BY Drake & ATT'YS.

UNITED STATES PATENT OFFICE.

LEWIS S. CHICHESTER, OF NEWARK, NEW JERSEY, ASSIGNOR TO CARROL PHILLIPS BASSETT, OF SAME PLACE.

WATER-RENOVATOR.

SPECIFICATION forming part of Letters Patent No. 398,494, dated February 26, 1889.

Application filed March 24, 1888. Serial No. 268,332. (No model.)

*To all whom it may concern:*

Be it known that I, LEWIS S. CHICHESTER, a citizen of the United States, residing at Newark, in the county of Essex and State of New Jersey, have invented certain new and useful Improvements in Water-Renovators; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to more perfectly and inexpensively purify and renovate water in large quantities for the use of cities, towns, and for other purposes requiring a large consumption of water; and it consists in the improved water renovating and purifying devices and in the processes substantially as will be hereinafter set forth, and finally embodied in the clauses of the claim.

Figure 1:
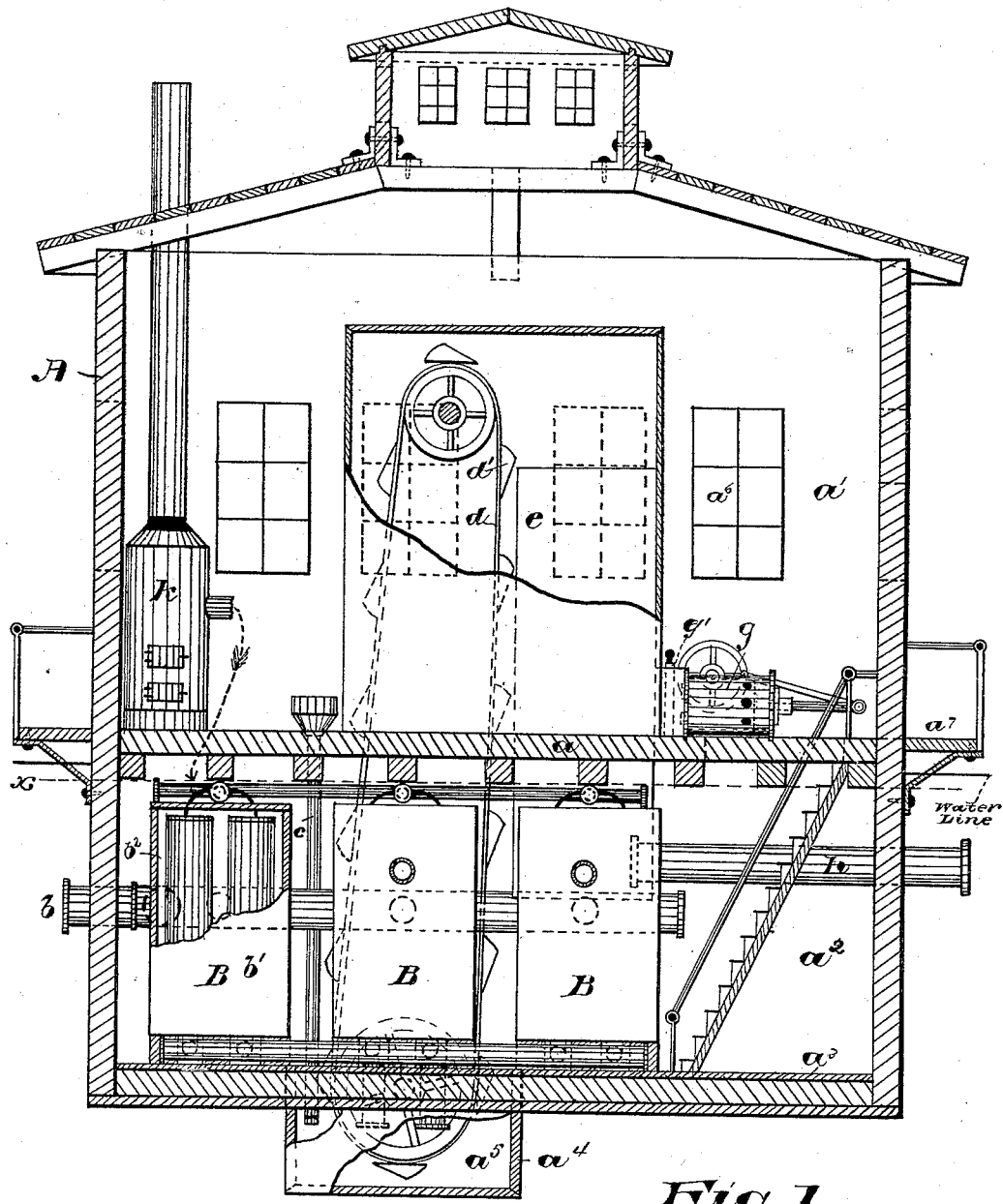
Figure 2:
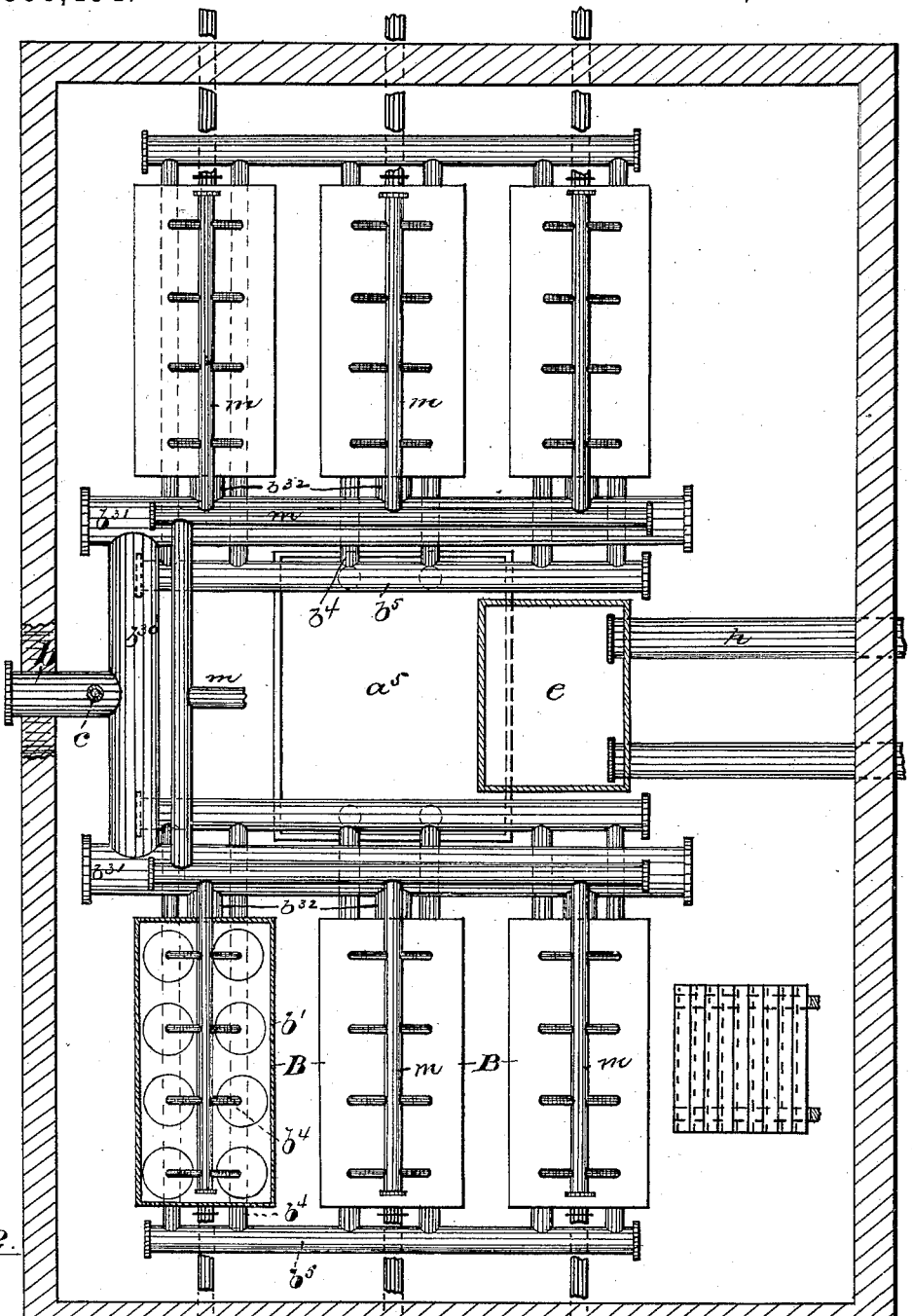
Figure 3:
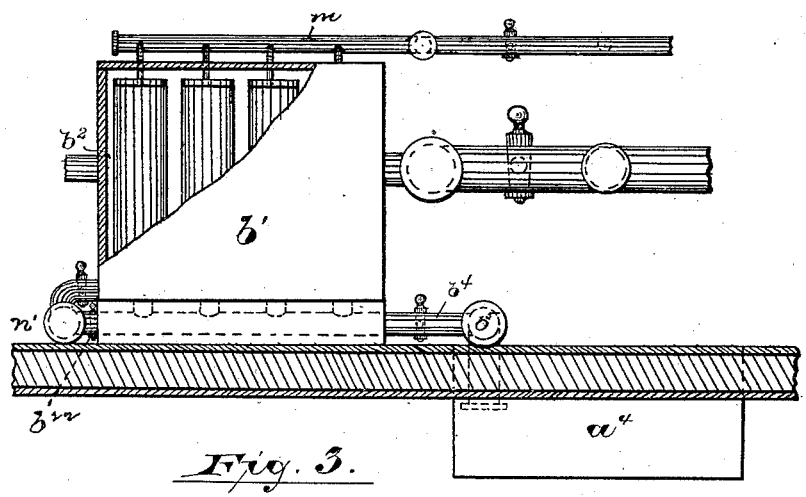
Figure 4:
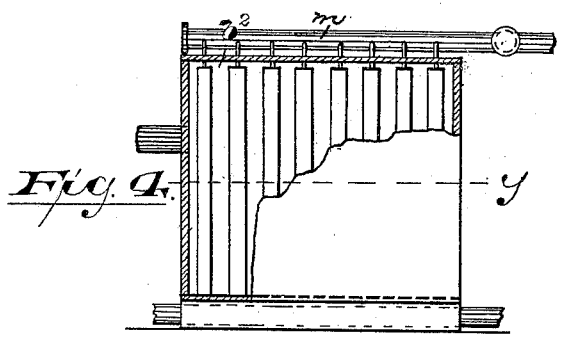
Figure 5:
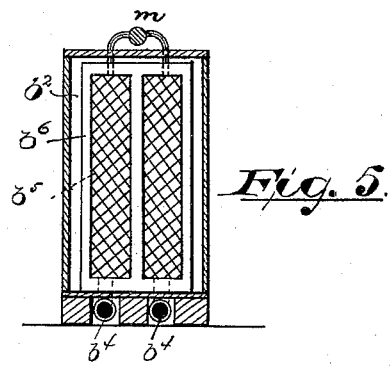
Figure 6:
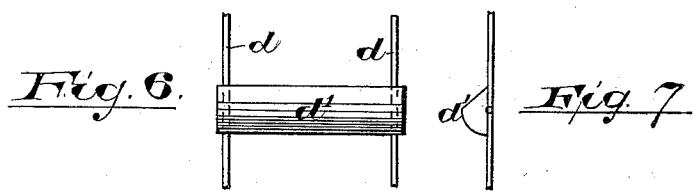
Figure 7:
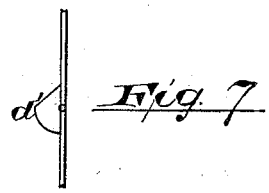
Figure 8:
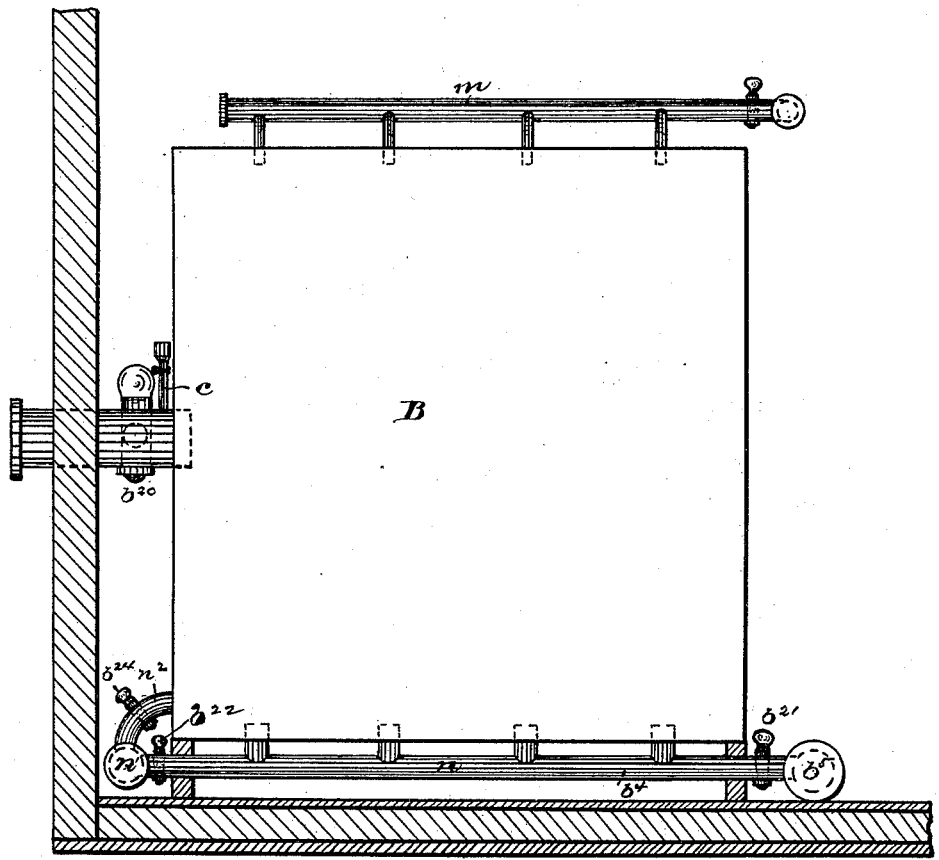
Figure 9:
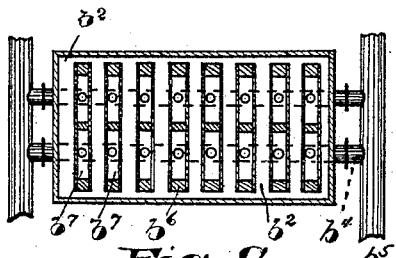
Figure 10:
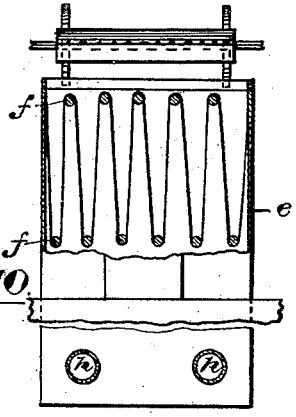

Referring to the accompanying drawings, embraced in five sheets, in which like letters of reference indicate corresponding parts in each of the several figures, Figure 1, Sheet 1, is a vertical sectional view of a structure preferably in the form of a float or movable upon a body of water, showing the arrangements of the various parts employed in filtering, aerating, and in otherwise renovating the water and bringing it into a fit condition for drinking or rendering it suitable to be distributed through a city or town. Fig. 2, Sheet 2, is a sectional view taken at line X of Fig. 1, showing, however, certain changes or variations in the construction of the device or in the disposition of the parts, and showing the filtering mechanism and mechanism for cleansing the same in detail. Figs. 3, 4, and 5, Sheet 2, are detail views of parts of the filtering apparatus, which will be hereinafter more fully described; and Figs. 6 and 7 are details of certain buckets for elevating the water prior to aerating the same. Fig. 8, Sheet 4, is a detail view of the filtering mechanism, showing certain modifications therein. Fig. 9 is a section taken on line Y, Fig. 4; and Fig. 10 is a sectional view in detail, showing an aerating device. Fig. 11, Sheet 5, is a vertical sectional view of a float, showing another construction thereof, adapted to deliver the water after the same is renovated at a lower level.

In said drawings, A is a large structure of sufficient capacity to receive an engine, pump, filters, &c., which compose the improved system or plant, the same being made impervious to water at the bottom, so that it may serve as a floating vessel adapted to be placed in a reservoir of water, either artificial or natural, and movable therein, so as to accommodate itself to the varying tides or depth of the water. The said float is divided by a flooring, $a$, into upper and lower chambers, $a'$ and $a^2$, the upper of said chambers serving to receive the engine, pump, &c., and the lower of said chambers to receive the filtering materials and means for elevating the water and for cleansing the apparatus, and for coal, &c., the said lower chamber being, in parts at least, below the level of the surface of the water. Said lower chamber is used as an air-chamber for giving buoyancy to the structure and contents, and it may be supplied with a ballast to regulate and control the depth of the float in the water. Below the flooring $a^3$ a well, $a^4$, is formed. Into the chamber $a^5$ thereof the filtered water is allowed to run by gravity prior to its being elevated, as hereinafter provided for. The said structure may be provided with suitable windows, $a^6$, and at the outside, just above the water-line, may be erected a platform, $a^7$, which surrounds the building, and from which the surrounding water may be cleared of scum. Within the float, preferably in the bottom chamber, $a^2$, are arranged a series of filters, B, which are arranged below the surface of the water in the reservoir, and are provided with inlet or supply pipes $b$, which allow the water of the said reservoir to float naturally or automatically into said filters. The said filters consist, preferably, of an outer casing or tank, $b'$. Said filters, within the tanks thereof, are divided into an unfiltered-water chamber and a series of filtered-water chambers by means of partitions or diaphragms of filtering material of any suitable kind, the filtering materials preferably in this connection being either compressed carbon, pottery, or fibrous material—such as heavy cotton, linen, or other cloth—having a wire screen, $b^5$, on opposite sides to support the said fibrous material, substantially as shown in detail in Fig. 5.

The filtering materials are preferably arranged in frames $b^6$, as indicated in Fig. 5, and are so disposed in relation to one another as that a series of filtered-water chambers, $b^7$, Fig. 9, are formed within the large unfiltered-water chamber $b^2$. The water entering the unfiltered-water chamber $b^2$ through the inlet or supply pipe $b$ from the outside passes through the filtering material into the filtered-water chamber $b^7$. The said filtered-water chambers communicate through pipes $b^4$ with exit-pipes $b^5$, which lead the filtered water to the well $a^4$, as shown in Figs. 1 and 3, preliminary to subjecting the water to the aerating processes.

Prior to the water passing into the filter the same is subjected to the action of a coagulant, such as alum. This is done, preferably, by means of a coagulant-pipe, $c$, (shown in Figs. 1, 2, 8, and 11,) the said pipe or receptacle either connecting with an inlet-pipe, $b$, whereby the said coagulant will be supplied to the water in limited quantities in any suitable manner, and the organic matter in the water coagulated before passing through the filter above referred to, or I may connect the coagulant-supply pipe with the well under some conditions, as indicated in Fig. 1. In this case the water may be subjected to another filtration.

The filtered water having arrived at the well $a^4$, above described, it may be aerated in either of the following ways: I prefer to elevate the water at this point from the well by means of an endless belt or chain, $d$, having therein a series of buckets, $d'$, or equivalent elevating devices. The water being elevated about fifteen feet above the point of final outlet, it is thrown into a tank, $e$, (shown in detail in Fig. 10,) where it may be again filtered through filtering mediums, such as have already been described, although I prefer to provide a special arrangement of the mediums, as shown in Fig. 10, where, it will be observed, the filtering medium consists of a felt cloth stretched over a series of bars, $f$ $f$, in the manner indicated, whereby a very large filtering-surface is secured. Beneath the said filtering material is arranged an air-inlet, through which air is forced by means of a pump, $g$, Fig. 1.

As the water passes through the filtering medium in a shower or broken stream, it is brought into very intimate contact with the compressed air below said filtering medium, so that it is thoroughly aerated, and passes with said air out through the discharge-pipe $h$, connected with the bottom of the said tank $e$ and with the distributing-pipes leading to the consumer. The air thus remains under pressure in the said pipes, commingled with the water until it is used. The air before passing into the tank $e$ is forced through a suitable filter, $g'$, Fig. 1, by means of which the same is freed of any dust and impurities or disease-germs which would tend to contaminate the water.

The mechanism for driving the elevating mechanism and the pump for introducing air may be an ordinary vertical engine, $l$, connected with said elevating mechanism by means of pulleys and belting or other mechanism, in any well-known or ordinary manner. By this construction the water is or may be delivered to the main pipe at or near the surface of the water.

Under some conditions, where I am allowed to deliver the water at a greater depth or considerably below the surface of the water, I may dispense with the elevating mechanism, as indicated in Fig. 11. In this case the well is provided with an air-chamber, $a^{11}$, formed by partitions $a^{15}$, $a^{16}$, and $a^{18}$, the said air chamber or partitions being supported above the bottom of the flooring of the well by suitable supports or legs, $a^{17}$. Arranged in the bottom partition, $a^{16}$, are pipes $a^9$, and in the upper partition, $a^{15}$, are arranged larger pipes, $a^{10}$, which extend over and around the smaller pipes, $a^9$, the lower ends of the said larger pipes preferably flaring, as at $a^{12}$. The air-chamber $a^{11}$ receives the air from a suitable air-pump—such as the one illustrated in Fig. 1 at $g$—through a pipe, $a^{13}$, and is forced through the flaring extremity $a^{12}$ of the pipes $a^{10}$ upward and in contact with the water as it rises in the pipes $a^9$. The force of the air passing through the spaces between the inner and outer pipes produces a vacuum, which causes the water to pass upward through said smaller pipes with greater velocity and throws the water considerably above the upper extremity of the larger pipes, forming sprays or fountains within the chamber $a^4$, thus bringing the air into intimate contact with the water. This spraying of the water is done repeatedly and continuously before the water is allowed to pass outward from the pipes $a^{19}$, which corresponds with the pipe $h$, except that it is arranged at a lower level. Above the wall the chamber $a^2$ is partitioned off to prevent the spray from interfering with the operations of the workmen within the said chamber. The passage of air through the pipes $a^{13}$ produces a continual pressure in the chamber $a^{14}$, so that the air remains in the water under pressure as it passes off through the pipes $a^{19}$.

It will be understood that the oxygen of the air remaining in contact with the water tends to burn out or oxidize the impurities of the water and keeps the same in a lively or sparkling state.

Referring back to the series of filters B B, the same are so arranged in relation to one another and with the inlet and exit pipes as that all communication between each individual filter can be cut off from the others and from said supply and exit pipes, so that the supply of filtered water can be controlled should any accident occur to the said individual filters, and the same can be repaired without interfering with the operations of the others, and so that the individuals can be cleansed without shutting off the others.

In practical operation I prefer to have double the number of filters, or I prefer to have the capacity of the plant double that which is requisite to give a sufficient supply to the city or consumer. In this way I am enabled to allow one part of the plant to lie idle, so far as filtering operations are concerned, for the purpose of cleaning the idle filters while the others are performing functions of filtering.

I have provided my improved filtering devices with means whereby the said filtering diaphragms or materials may be readily cleansed from time to time, or as often as is found necessary. I prefer to cleanse the said materials or diaphragms by first closing the inlet-pipes $b$ to said filters by means of suitable valves or cocks, $b^{20}$, (shown in Fig. 8,) and allowing the unfiltered water to filter out in the manner already described. After the said filter is thus emptied of the water, or approximately so, I cut off communication with the well by means of the cocks $b^{21}$, and allow exhaust-steam to enter the filter through suitable steam-pipes, $m$, Figs. 3, 4, and 5, which connect with the engine $k$ in any suitable manner. The said steam enters the pure-water chambers of the filter and passes downward through said chamber into the tube or pipe $b^4$, cleansing the same and forcing the impurities into the waste-pipe $n'$. The stop-cock $b^{22}$, Fig. 8, is then turned, and the steam is forced through the filtering material in a direction opposite that taken by water when being filtered, the steam killing any live matter that may be in the pores of the filtering material and freeing the said pores of all impurities, and the water of condensation carrying impurities to the waste-pipe $n$ through the pipe $n^2$ to connect the unfiltered-water chamber with the said pipe $n'$, from which latter the water and the sediment may be pumped off by means of a pump and delivered through a flexible pipe, or in any other manner, to the land adjacent to said reservoir, so that the said sediment or filtered matter cannot again re-enter the said reservoir. When the filter is filtering, the pipe $n^2$ is closed by means of the cock or valve $n^{24}$. Thus the tank $b'$ of the filter as well as the pure-water chambers and filtering media therein are thoroughly cleansed without any great expense of labor or trouble on the part of the attendant.

The tops of the filtered-water tanks $b'$ are preferably removable, and above the tanks the flooring $a$ may be provided with trap-doors, through which the filtering diaphragms or media may be drawn from or lifted out of the tank for the purpose of substitution, repair, or cleansing.

The inlet-pipes $b$ are preferably provided with suitable screens to prevent floating matter from entering therein.

It will be observed upon reference to Fig. 2 that the drawings show a single inlet-pipe for the outside water, which connects with branch pipes $b^{30}$, $b^{31}$, $b^{32}$, and $b^{33}$, leading to the several independent filters, and in the same drawings the said filters are shown to be connected directly with the outside, whereby each individual filter receives its water independently. While I may employ either or both of said constructions, I prefer the latter, as it is more simple and cheap in construction and enables me to obtain a more perfect control of my system or plant.

The filtering-diaphragms may be flat, as indicated in Fig. 9, or be tubular or cylindrical, as in Figs. 1, 2, and 3.

I am aware that in the United States Patent No. 17,028 a floating filtering device is shown; but the general construction and operation are widely different from the improved device in that the latter is adapted to remove the water from a reservoir, river, or pond on a large scale and filter the same for the use of cities, and in that the filter is arranged in the float in one sense independent of it, so that the parts of the said filtering apparatus may be disorganized for the purposes of cleansing, repair, &c., while the float still remains in the reservoir, a chamber being formed within the float around the filter in which men may work below the level of the surface of the water. Thus the float has more the nature of a boat having a filter in its hold communicating with the outside water.

I am further aware that in a prior patent a tank in which a series or collection of nested filtering-cylinders through which the water passes into a chamber common to them all is old. In the use of such a structure in connection with my apparatus for cleansing, it is evident that should fine particles of sedimentary matter pass through to the chambers between the individual cylinders of the nests and settle therein the steam for cleansing would have no efficient access to it, in that, coming into contact with the first cylinder, it would condense, and thus have no effect on the said settlings within the chamber or in cleansing the second cylinder, and as a result the filtering apparatus would frequently have to be taken apart, or otherwise it would become filthy. Another group of filters arranged in a tank and connecting with a common exit have been shown; but its construction differs materially from my improvements. In my improvement but a single cylinder or filtering-diaphragm, without having chambers, joints, or receptacles in which sediment may lodge between it, is provided, so that the steam in passing through or into the filtering medium in a direction opposite that of the flow of the water in filtering is effective in cleansing the whole of the said medium, and no opportunity is allowed for the accumulation of sediment where it cannot be removed by flushing.

Again, I am aware that air has been filtered to remove dust and vermin by allowing it to pass through filtering-matter before bringing it into contact with water; but in my improvement the air is forced through by abnormal pressure, and thus a much closer filtering medium may be employed and the air is brought under abnormal pressure, whereby it is brought into more intimate contact with the water, so that the latter will absorb or mix or commingle with a greater quantity of the purified air and carry the same to the supply-pipes, giving life and purity to the water, so that the water and air remain together until used. The relation of the water-filter, the breaking or spraying apparatus, and air-pump is such as that when air and water are thoroughly commingled the mixture passes off under abnormal pressure into the supply-pipes, the water thus retaining the air until it passes off from the pipes, and time is given for a thorough aeration and oxygenation of the filtered and chemically-treated water.

Having thus described the invention, what I claim as new is—

1. In a water-renovating device, the combination, with a filter-tank, $b'$, of a series of pure-water chambers formed by filtering materials within the unfiltered-water chamber of said tank, steam-pipes for conducting steam to said pure-water chambers, pipe $b$, for allowing an inflow of reservoir-water, pipes $b^4$ $b^5$, for leading the filtered water from said filter, and having cock $b^{21}$, for closing off exit therethrough, a waste-pipe, $u$, connecting with said pipe $b^4$, and having a cock, $b^{22}$, and a pipe, $n^2$, leading from the unfiltered-water chamber to said waste-pipe, and having a cock, $n^3$, therein, substantially as and for the purposes set forth.

2. The improved floating renovator herein described, combining therein a vessel or structure impervious to water at the bottom and partitioned to form a chamber, $a^2$, and an aerating-chamber, $a^4$, therein, filters disposed in chamber $a^2$ and divided or partitioned by filtering media into filtered-water chambers and unfiltered-water chambers, inlet-pipes connecting the unfiltered-water chamber of the filters with the exterior of the said vessel or structure, said pipes being open at said exterior to allow an inflow of reservoir-water by gravity, pipes connecting the filtered-water chamber with the aerating-chamber, and exit-pipes connecting the aerating-chamber with the outside of the said structure, whereby the filtered and aerated water may be conducted to the main supply-pipes, and an air-pump for forcing air into said aerating-chamber and bringing the air in said chamber under an abnormal pressure, substantially as and for the purposes set forth.

3. The improved water-renovator herein described, combining therein a vessel or structure partitioned to form chambers $a'$ $a^2$, and partitioned to form an aerating-chamber, a series of filtering-tanks arranged in said chamber $a^2$, and having therein filtering media, and unfiltered-water chambers and filtered-water chambers, inlet-pipes open to receive reservoir-water and connecting with said tanks, pipes or ducts connecting the tanks and aerating-chamber, and exit-pipes connecting the aerating-chamber with the exterior of the vessel, and adapted to conduct the filtered and air-impregnated water to the main supply-pipe, substantially as and for the purposes set forth.

4. In combination, a vessel or structure having a chamber, $a^2$, therein and impervious to water at the bottom, and thus adapted to float or be partly immersed in a reservoir without leakage or an uncontrolled inflow thereto, a series of tanks arranged in the chamber $a^2$ and open to the outside of the said vessel or structure, and having a series of filtering-diaphragms therein, an aerating-chamber, and means, as described, for breaking the water into spray therein, and an air-pump for introducing an abnormal quantity of air into said aerating-chamber, ducts for conveying the water from the filtering-tanks to the aerating-chamber, and ducts or pipes for allowing the outflow of the filtered and air-impregnated water, substantially as and for the purposes set forth.

5. In combination, in a water-renovator, a vessel or structure having a chamber, $a^2$, for the reception of tanks and an aerating-chamber, pipes for leading reservoir-water through the chamber $a^2$ to said tanks, an elevator for raising the filtered water to the aerating-chamber, a pump connected with said aerating-chamber and adapted to force air therein and produce an abnormal air-pressure therein, and a pipe for conveying the filtered and air-impregnated water from the said vessel or structure, substantially as and for the purposes set forth.

In testimony that I claim the foregoing I have hereunto set my hand this 22d day of March, 1888.

LEWIS S. CHICHESTER.

Witnesses:
CHARLES H. PELL,
PHILIP G. VOEGTLEN.